No. 823,380. PATENTED JUNE 12, 1906.
S. WALTER.
FEEDING TROUGH.
APPLICATION FILED FEB. 28, 1906.

WITNESSES:
Frank Hough
D. W. Gould.

INVENTOR
S. Walter.

BY Victor J. Evans
Attorney

UNITED STATES PATENT OFFICE.

SIDNEY WALTER, OF MARYSVILLE, KANSAS.

FEEDING-TROUGH.

No. 823,380.      Specification of Letters Patent.      Patented June 12, 1906.

Application filed February 28, 1906. Serial No. 303,491.

*To all whom it may concern:*

Be it known that I, SIDNEY WALTER, a citizen of the United States, residing at Marysville, in the county of Marshall and State of Kansas, have invented new and useful Improvements in Feeding-Troughs, of which the following is a specification.

The invention relates to an improvement in feeding-troughs primarily designed for use of animals and constructed to guard against interference with each other while feeding and the contamination of the food through improper use of the trough by the animal.

The main object of the present invention is the production of a trough divided longitudinally and transversely into a series of separate compartments, the compartment-forming structure having hinged relation to the trough to permit independent movement thereof for purposes of cleaning the trough or inserting the food.

The invention will be described in the following specification, reference being had particularly to the accompanying drawings, in which—

Figure 1:
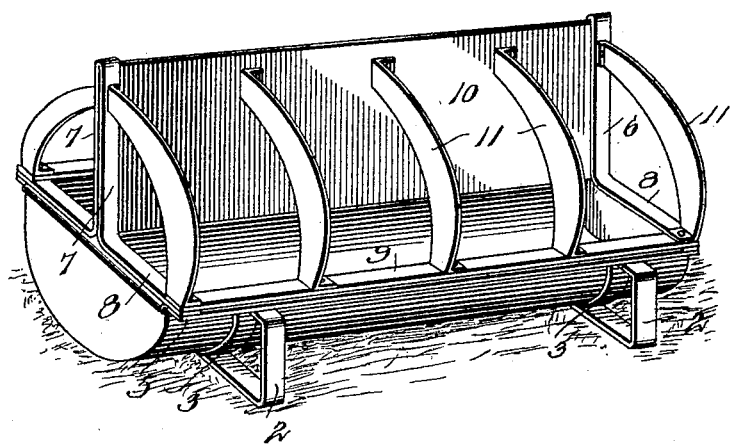
Figure 2:
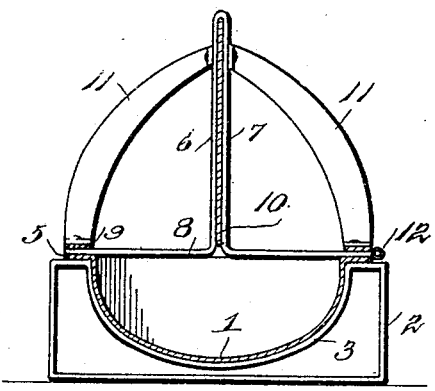
Figure 3:
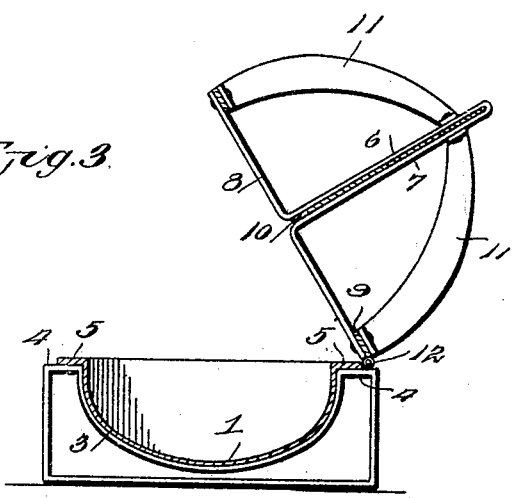

Figure 1 is a perspective view of the trough constructed in accordance with my invention. Fig. 2 is a transverse sectional view of the same. Fig. 3 is a similar view, the compartment-forming structure being shown elevated relative to the trough.

Referring particularly to the drawings, my invention comprises a trough 1, preferably of integral sheet-metal structure and of any desired longitudinal and transverse dimension. The trough is preferably of semi-elliptical shape in cross-section and adapted for supporting base-frames 2, preferably constructed of a single strip bent to form an upper bar 3, conforming in size and shape to the sectional contour of the trough and adapted to receive the latter therein, the bottom and sides of the frame being disposed relatively at right angles to provide for the necessary stability of the structure. The frame on each side the trough-receiving depression is formed with horizontal rests 4, designed to receive lips 5, projecting from the trough proper and extending longitudinally thereof.

In connection with the trough proper I use what I term a "partition-forming" structure, comprising end strips 6, centrally bent to provide spaced parallel arms 7, and laterally-projecting arms 8, extending at right angles from and in alinement, though in reverse directions, upon the lower ends of the arms 7.

The arms 8 are together approximately equal in length to the width of the trough, so that when said arms are in position the upright arms 7 extend vertically and centrally above the trough. The strips 6 are arranged above the ends of the trough proper, and the terminals of the arms 8 are secured beneath longitudinally-arranged strips 9, designed to overlie the lips 5 of the trough, as clearly shown in Fig. 2.

Secured between the arms 7 of the end strips is a partition-plate 10, which extends longitudinally of and centrally of the trough, said plate terminating at its lower edge in alinement with the upper edge of the trough, as clearly shown in Fig. 2. The plate is secured in position by any desired fastening means, such as bolts, rivets, or the like, passing through the spaced arms 7 and the plate. As thus constructed the trough is divided into two longitudinal compartments, so far as the feeding of the animals is concerned, though it is obvious of course that below the longitudinal partition the interior of the trough is free of obstruction, so that food poured in one side will distribute itself evenly throughout the trough.

Secured to the longitudinal partition and to the longitudinal strip 9 of the partition forming the structure is arranged a series of partitions or dividing-arms 11, preferably comparatively narrow strips of material terminally bent to provide laterally-extending flanges and of arcuate shape to permit the securing of said flanges to the partition and strip 9, respectively. The end division-arms are secured to the end strips 6 at one end and to the longitudinal strip 9 at the opposite end, the bolts for securing said arms at the upper end preferably serving to also secure the longitudinal partition in place. It will be noted that the desired number of these arms are secured on each side of the longitudinal partition, being connected thereto near the upper edge of said plate and extending from such position in downwardly and outwardly curved planes to the longitudinal strip 9 on each side.

The longitudinal strip 9 on one side the partition-plate 10 is hinged at 12 to the lip 5 of the trough, so that said partition-forming structure as an entirety may be turned back upon such hinged connection to afford access to the interior of the trough for cleaning or the like.

In use the animals are restricted to a certain portion of the trough for feeding purposes and by virtue of the division-arms 11 are prevented from any improper use of the trough, such as getting their feet or other portions of their body therein.

The trough is primarily designed for the feeding of hogs or the like, though by a simple change of proportions it may be readily adapted for other animals or for fowls. The construction is simple, and the hinged connection between the trough proper and the partition-forming structure permits ready access to the trough for any desired purpose.

Having thus described the invention, what is claimed as new is—

1. A feeding-trough comprising a trough proper, a partition-forming structure having hinged connection therewith, said structure comprising end strips arranged to provide vertically-extending spaced arms, a partition-plate secured between said arms and extending longitudinally and centrally of the trough, and a series of division-arms connected to said plate and extending in opposite directions therefrom, said arms being outwardly and downwardly curved and supported above the side edges of the trough.

2. A feeding-trough comprising a trough proper, a partition-forming structure including end strips arranged to provide vertically-extending spaced arms and laterally-extending arms, side strips connecting the terminals of said laterally-extending arms, a partition-plate secured between the spaced arms of the end strips and extending longitudinally of the trough, and a series of division-arms connected to the plate and to said side strips.

3. A feeding-trough comprising a trough proper, a partition-forming structure including end strips arranged to provide vertically-extending spaced arms and laterally-extending arms, side strips connecting the terminals of said laterally-extending arms, a partition-plate secured between the spaced arms of the end strips and extending longitudinally of the trough, and a series of division-arms connected to the plate and to said side strips, said division-arms being arranged in edgewise relation to the partition-plate, whereby to present a relatively broad surface disposed at right angles to the partition-plate.

In testimony whereof I affix my signature in presence of two witnesses.

SIDNEY WALTER.

Witnesses:
   JNO. H. COLE,
   A. R. SHUNWEY.